(12) United States Patent
Rey et al.

(10) Patent No.: US 9,290,846 B2
(45) Date of Patent: Mar. 22, 2016

(54) CHROMIUM-FREE CONVERSION COATING

(71) Applicant: The Boeing Company, Chicago, IL (US)

(72) Inventors: Nieves Lapena Rey, Madrid (ES); Patricia Santa Coloma Mozo, Vitoria-Gasteiz (ES); Usoa Izagirre Etxeberria, Zumaia (ES); Oihana Zubillaga Alcorta, Hernani (ES); Francisco J. Cano Iranzo, Donostia-San Sebastian (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/628,756

(22) Filed: Feb. 23, 2015

(65) Prior Publication Data

US 2015/0252480 A1 Sep. 10, 2015

(30) Foreign Application Priority Data

Mar. 5, 2014 (EP) .................................. 14382078

(51) Int. Cl.
| | | |
|---|---|---|
| C23C 22/34 | (2006.01) | |
| C23C 22/78 | (2006.01) | |
| C09D 165/00 | (2006.01) | |
| C23C 22/36 | (2006.01) | |
| C09D 5/08 | (2006.01) | |

(52) U.S. Cl.
CPC . *C23C 22/34* (2013.01); *C09D 5/08* (2013.01); *C09D 165/00* (2013.01); *C23C 22/361* (2013.01); *C23C 22/78* (2013.01); *C23C 2222/20* (2013.01); *Y10T 428/31663* (2015.04)

(58) Field of Classification Search
None
See application file for complete search history.

(56) References Cited

U.S. PATENT DOCUMENTS

| | | | |
|---|---|---|---|
| 5,194,138 A | 3/1993 | Mansfield et al. | |
| 5,342,456 A * | 8/1994 | Dolan ...................... | C23C 22/34 148/247 |
| 5,362,335 A | 11/1994 | Rungta | |
| 6,077,885 A | 6/2000 | Hager et al. | |
| 6,190,780 B1 | 2/2001 | Shoji et al. | |
| 6,875,479 B2 | 4/2005 | Jung et al. | |
| 7,048,807 B2 | 5/2006 | Stoffer et al. | |
| 7,407,711 B2 | 8/2008 | Phelps et al. | |
| 2008/0254283 A1* | 10/2008 | Shimoda ................ | C25D 13/18 428/336 |
| 2010/0009083 A1 | 1/2010 | Cano-Iranzo et al. | |
| 2012/0204762 A1 | 8/2012 | Albert et al. | |
| 2013/0052352 A1 | 2/2013 | Cano-Iranzo et al. | |

FOREIGN PATENT DOCUMENTS

| | | |
|---|---|---|
| EP | 1 217 094 | 6/2002 |
| JP | 2006 328445 | 12/2006 |
| WO | WO88/06639 | 9/1988 |
| WO | WO2004/059035 | 7/2004 |
| WO | WO2011/058209 | 5/2011 |
| WO | WO 2011/058209 | 5/2011 |
| WO | WO2013/054064 | 4/2013 |
| WO | WO 2013/054064 | 4/2013 |

OTHER PUBLICATIONS

"Evaluation of Corrosion Resistance and Self-healing Behavior of Zirconium-Cerium Conversion Coating Developed on AA2024 Alloy" authored by Yoganandan et al. and published in Surface and Coatings Technology (2015) 270, 249-258.*
Abstract for CN 103642365 (Mar. 2014).*
Extended European Search Report, EP 14 382.078.5 (Sep. 25, 2014).
Palanivel et al., "Modified silane coatings as an alternative to chromates for corrosion protection of aluminum alloys," *Silanes and Other Coupling Agents*, vol. 3, pp. 135-159 (2004).
Balaskas et al., "Influence of the doping agent on the corrosion protection properties of polypyrrole grown on aluminum alloy 2024-T3," *Progress in Organic Coatings*, vol. 71, No. 2 (2011).
Bethencourt et al., "High protective, environmental friendly and short-time developed conversion coatings for aluminum alloys," *Applied Surface Science*, vol. 189, pp. 162-173 (2002).
Bethencourt et al., "High protective, environmental friendly and short-time developed conversion coatings for aluminium alloys," *Applied Surface Science* 189, 162-173 (2002).
Dabalà et al., "Cerium-based conversion layers on aluminum alloys," *Applied Surface Science* 172, 312-322 (2001).
Kiyota et al., "Anticorrosion behavior of conversion coatings obtained from unbuffered cerium salts solutions on AA6061-T6," *Journal of Rare Earths* 29, 961-968 (2011).
Dong-chu et al., "Microstructure and formation mechanism of Ce-based chemical conversion coating on 6063 Al alloy," *Trans. Nonferrous Met. Soc. China* 19, 592-600 (2009).
Johnson et al., "Effect of coating parameters on the microstructure of cerium oxide Johnson coatings," *Materials Science and Engineering* A361, 225-231 (2003).
Decroly et al., "Study of the deposition of cerium oxide by conversion on to aluminium alloys," *Surface & Coatings Technology* 194, 1-9 (2005).
Kozhukharov et al., "Protective ability of hybrid nano-composite coatings with cerium sulfate as inhibitor against corrosion of AA2024 aluminium alloy," *Progress in Organic Coatings* 73, 95-103 (2012).
Yasakau et al., "Cerium molybdate nanowires for active corrosion protection of aluminium alloys," *Corrosion Science* 58, 41-51 (2012).
Markley et al., "Corrosion protection of AA2024-T3 using rare earth diphenyl phophates," *Electrochimica Acta* 52, 4024-4031 (2007).
Hill et al., "Corrosion inhibition of 7000 series aluminium alloys with cerium diphenyl phosphate," *Journal of Alloys and Compounds* 509, 1683-1690 (2011).

(Continued)

*Primary Examiner* — Marc Zimmer (74) *Attorney, Agent, or Firm* — Walters & Wasylyna LLC (57) ABSTRACT

A conversion coating composition including a conducting polymer dispersion, at least one silane and inorganic metallic salts, wherein a pH of the composition is between 1.0 and 6.0, and wherein the inorganic metallic salts include at least one zirconium salt and at least one cerium nitrate salt.

20 Claims, 1 Drawing Sheet

(56) References Cited

OTHER PUBLICATIONS

Campestrini et al. "Formation of a cerium-based conversion coating on AA2024: relationship with the microstructure," *Surface Coatings and Technology* 176, 365-381 (2004).

Joshi et al., "Disolution of cerium from cerium-based conversion coatings on Al 7075-T6 in 0.1M NaCl solutions," *Corrosion Science* 60, 290-295 (2012).

* cited by examiner

CHROMIUM-FREE CONVERSION COATING

PRIORITY

This application claims priority from European Patent Application Number EP14382078.5 filed on Mar. 5, 2014, the entire contents of which are incorporated herein by reference.

FIELD

This application relates to coatings and corrosion control on metals, in particular to a chromium-free conversion coating suitable, among others, for aircraft, automotive, marine, construction, industrial and household applications. Additionally, this application relates to a chromium-free composition and a process for the treatment of a metallic surface comprising the application of such composition onto the metallic surface, obtaining a metallic surface coated with a chromium-free conversion coating.

BACKGROUND

Corrosion is defined as the chemical or electrochemical reaction between a material, usually a metal, and its environment that produces a deterioration of the material and its properties.

Corrosive attack begins on the surface of the metal. The corrosion process involves two chemical changes. The metal that is attacked or oxidized undergoes an anodic change, with the corrosive agent being reduced and undergoing a cathodic change. The tendency of most metals to corrode creates one of the major problems in the maintenance of aircraft, particularly in areas where adverse environmental or weather conditions exist.

Chromium-based anti-corrosive systems containing hexavalent chromium compounds have proven to be an extremely useful and versatile group of chemistries that are extensively used in aircraft metal treatment processes. They impart many beneficial and essential anti-corrosive characteristics to metallic substrates on which they are applied and have been used extensively for the pre-treatment of metals before coating, adhesive bonding and surface finishing.

Chemically, chromium-based anti-corrosive systems have involved the combination(s) of hexavalent chromium (e.g., $CrO_3$, $CrO_4^{2-}$, $Cr_2O_7^{2-}$) and hydrofluoric acid (HF) in the case of aluminum and its alloys. The hydrofluoric acid removes oxide film from the surface of the metallic substrate (e.g., aluminum) and the hexavalent chromium reacts with the exposed metal and a trivalent chromium oxide precipitates. Using aluminum as an example:

$$Cr_2O_7^{2-}+2Al^0+2H^+\rightarrow Cr_2O_3.H_2O+Al_2O_3$$

Chromium oxide such as that produced according to the above reaction is quite useful in anti-corrosive applications. It is quite stable in alkaline environments, it is water repellant (hydrophobic) and may act as a barrier coating towards water. Finally, it exhibits a "self-healing effect," that is, residual hexavalent chromium in the coating may react with damaged areas of the coating, thereby producing more trivalent chromium oxide at damaged sites and therefore "healing" itself.

Consequently, chromium-based, and in particular hexavalent chromium-based systems, have been extensively used in the aircraft industry because they have proven to be: highly effective at preventing corrosion and as an adhesion promoter for organic coatings and adhesives; particularly resilient as the application/treatment process exhibits a low sensitivity towards variation in process conditions; extremely effective on most/all aluminum alloys; and ensure considerable quality control characteristics as a skilled worker may tell the amount of chromium on the surface of a substrate by mere inspection (color) of the coating.

Concern about chromium, in particular hexavalent chromium, in the environment has generated a need to replace chromium-based systems. Hexavalent chromium salts are classified as hazardous substances (toxic, sensitizing and carcinogenic). Consequently, they are environmentally and toxicologically undesirable. The European Parliament has published directives requiring the elimination of hexavalent chromium such as directive 2002/95/EC for electrical and electronic equipment and directive 2000/53/EC for the automotive sector. Therefore "environmentally friendly," commercially acceptable alternative to chromium-based systems are highly desirable.

Processes and compositions for Cr-free conversion coatings with good corrosion resistance were described in the Patent Application US2010/0009083 A1 by the same inventors. This U.S. Patent Application describes a conversion coating for the treatment of surfaces comprising a conducting polymer dispersion containing an inorganic metallic salt of at least one of molybdenum, magnesium, zirconium, titanium, vanadium, cerium, hafnium, silicon, aluminum, boron, cobalt and zinc. The conversion coatings described in the above-mentioned patent application showed very good corrosion performance. However, a good adhesion of the coatings to subsequent organic coatings was not achieved without jeopardizing the corrosion protection.

A significant improvement was developed by the same inventors and a new patent application was filed in October 2012, U.S. patent application Ser. No. 13/662,412 (published as US2013/052352 A1). This patent application describes a conversion coating comprising a conducting polymer dispersion, at least one silane and inorganic salts selected from at least one of molybdenum, magnesium, zirconium, titanium, vanadium, cerium, hafnium, silicon, aluminum, boron, cobalt and zinc. The silane compounds enhanced the adhesion performance so the coating complied with the requirements of aeronautical applications, while the corrosion protection as described in the examples of US2010/0009083 A1 was maintained. Moreover, the new conversion coatings obtained with the conducting polymer dispersions comprising at least one silane compound offered low surface contact electrical resistance, compliant with the requirements for aeronautical applications.

Now, the challenge is to optimize the chemical conversion process and the conversion coating to further enhance the corrosion protection without jeopardizing the adhesion.

Lanthanide ions as $Ce^{3+}$ and $Ce^{4+}$ forming insoluble hydroxides show low toxicity and are economically competitive products, since cerium is relatively abundant in nature. Therefore, cerium has been investigated to develop corrosion protection systems for aluminum alloys as alternative to chromates.

In particular, M. Bethencourt et al., in a paper titled "High protective, environmental friendly and short-time developed conversion coatings for aluminum alloys", which was published in Applied Surface Science 189 (2002) 162-173, described conversion coating treatments for AA5083 based on $Ce(NO_3)_2$ and $CeCl_3$ 0.005M solutions with pH adjusted to 5.5, deposited at temperatures ranging from 298K to 363K, and immersion times between 0.08 h and 24 h. The corrosion performance was studied through linear polarization curves. The best results are reported for $Ce(NO_3)_2$ treatments carried out at 348K for 120 min, showing an increase of the polarization resistance by a factor higher than 12.000 comparing to the bare alloy.

The above-mentioned publication deals with cerium conversion treatments containing no zirconium salts, conducting polymers or silanes. Further, the process described in M. Bethencourt et al. involves high temperatures and long immersion times to obtain satisfactory corrosion protection results, different from the process of the present invention wherein the coating may be carried out without heat treatment, preferably at room temperature between 1 to 10 minutes.

Botana et al., in the patent PCT WO2004/059035 A1 "Method of obtaining chromate-free conversion coatings on aluminum alloys" (Universidad de Cádiz, 2004) discloses a coating consisting of a mix of cerium rich islands onto intermetallic particles and aluminum oxide layer in the alloy matrix. Such a coating is obtained with a dipping process in an aerated solution containing 0.001-0.01M $Ce(NO_3)_3$ or 0.001-0.01M $CeCl_3$. The process is carried out in a temperature range of 323-363K for a maximum immersion time of 120 min. In one of the described options 0.5-30 mL/L $H_2O_2$ is added to the already heated solution, and immersion time is shortened to 30 minutes. The treated panels passed 168 h of salt spray test under ASTM B-117 without signs of corrosion. In electrochemical tests, a factor of improvement of 40 in the polarization resistance is obtained with respect to the panels treated at room temperature.

However, patent application WO2004/059035 A1 is related to cerium conversion coatings without the presence of conducting polymers or silanes. Furthermore, the procedure described in WO2004/059035 A1 involves high temperature and/or long immersion times comparing with the process for treatment of a metallic surface of the present application.

C. Rosero-Navarro et al., in the PCT patent application WO2011/058209 A1 "Vitreous coatings made using the sol-gel process for protecting metals against corrosion" (Consejo Superior de Investigaciones Científicas (CSIC), 2011), describe a composition and methods to obtain a vitreous coating made by sol-gel process. Said vitreous coating contains $Ce^{3+}$ ions in its structure, which migrates to damaged regions when the metal suffers corrosion phenomena. The hybrid coatings, formed from solutions containing cerium salts and organic complexing agent, are sintered in temperatures up to 250° C., and the resulting coating shows a thickness in the range of 100-1000 nm. The cerium salt is selected from the group of chlorides, sulfate, nitrates or halide, being preferably nitrate. The complexing agents are acetyl-acetone, glacial acetic acid, citric acid, diethanol-amine, or other compounds with carboxylic groups, and improve the stability of the sol and allows controlling of the final pH. One of the examples deals with the treatment of AA2024 panels (see composition in Table 1), coatings with a sol composed of $Ce(NO_3)_3 6H_2O$, glacial acetic acid, citric acid and butanodiol, with a final pH value of 2. The coating is sintered during 12 hours at 120° C., and it is further coated with an epoxy primer. The coated panel was exposed to salt spray test (ASTM B-117) with a scratch, and after 1000 h of exposure the scratch was still protected, attributed by the inventors to the passivation and active protection of the coating.

Another sol-gel process and coating for aluminum alloys is disclosed by F. Ansart et al. in the PCT patent application WO2013/054064 A1 "Process for the anticorrosion treatment of a solid metal substrate and treated solid metal substrate capable of being obtained by such a process" (Université Paul Sabatier Toulouse III, 2013). The described hybrid coating containing cerium nitrate, offers high adherence to the substrate and high mechanical resistance. Its corrosion protection performance is due to the barrier effect and self-healing or active corrosion protection in corrosion pits or other damaged areas. The active protection is conferred by the cerium compound, which can be either chloride, nitrate, acetate or sulfate. A particular coating is described in an example, composed of 3-(glycidoxypropyl)-trimehoxysilane (GPTMS), aluminum tri(s-butoxyde) (ASB) and cerium nitrate, with final cerium content of 0.01 mol/L. The sol is deposited onto AA2024-T3 (see composition in Table 1) and sintered at 110° C. for 3 h. The resulting coating shows a thickness of 6 microns, and offers an exposition between 96 and 800 h in salt spray test without corrosion.

The patent application US2012/0204762 A1 "Aqueous silane systems for bare corrosion protection and corrosion protection of metals" (P. Albert et al., Evonik Degussa GmbH, 2012) relates to an aqueous silane-based composition to be used in corrosion protection in metals. The composition contains metal salts of cerium (III) or cerium (IV) between other metals, and particular preference is given to nitrates and acetates. The resulting coating prevents pitting corrosion in aluminum alloys.

Patent applications WO2011/058209 A1 and WO2013/054064 A1, above summarized, describe sol-gel coatings incorporating cerium compounds. The compositions of both inventions are based on organic solvents, and require thermal treatment at high temperature as the final step of the coating process. Similar characteristics are shown by the silane system presented in the patent application US2012/0204762 A1.

The U.S. Pat. No. 6,077,885 "Chromate-free protective coatings" (H. E. Hager et al., The Boeing Company, 2000) discloses a polymeric coating providing corrosion protection of aluminum and its alloys used in the aircraft industry. The coatings of the invention have a "site blocking" or "buffering" action in that the corrosion inhibitors of the coatings are mobile and migrate into damaged areas to protect them from corrosion. This mobility is a result of the solubility of the inhibitors in the polymer matrix. The coating consists of a film-forming organic polymer or sol-gel containing metallic salts including cerium oxalates, acetates, borate, chlorides and others. The coating may be applied to aluminum alloy substrate as primer coat, a pigmented coat, or as a unicoat. The coating is preferably prepared in liquid form, with the polymer dispersed or dissolved, and the salts present controlled solubility in the polymer or sol-gel, or either they should be suspended in the blend. The salt content is preferably in the range of 100-300 ppm. The polymers are epoxy based, polyimides, polyurethanes, acrylics and alkyd-based systems. 2024-T3 panels (see composition in Table 1) coated with a formulations containing cerium oxalate and/or cerium acetate as inhibitor showed excellent dry and wet adhesion, but poor corrosion results in 1500 h and 3000 h of 5 wt. % NaCl salt spray test on described panels. In the organic polymer or sol-gel coating containing cerium compounds described in this patent, good adhesion results are reported for the cerium salt containing formulation, but with poor corrosion results in salt spray tests.

H. Shoji et al., in the U.S. Pat. No. 6,190,780 "Surface treated metal material and surface treating agent" (Nippon Steel Corporation, 2001), disclose a corrosion protection treatment for metal surfaces including aluminum and its alloys, composed mainly of a oxyacid compound of a rare earth element, other inorganic or organic compounds of rare earth elements, a resin, and an organic corrosion inhibitor. The oxyacid anion may be a phosphate, tungstate, molybdate and/or vanadate, the rare earth element can be cerium, and the corrosion inhibitor a conducting polymer. The treatment shows good adhesion and corrosion performance in the examples comprising the coating of various steel sheets. Although the corrosion protection treatment disclosed in this patent may comprise using cerium and conducting polymer as corrosion inhibitor, silanes are not mentioned. Adhesion and corrosion results are only depicted for zinc and steel.

The U.S. Pat. No. 6,875,479 "Method for coating metal surfaces with aqueous, polymer-containing composition, said aqueous composition and the use of the coated substrates" (C. Jung et al., Chemetall GmbH, 2005) relates to a method for coating a metallic surface including aluminum, with an aqueous composition that contains an polymeric film-forming agent, fine inorganic particles within the range from 0.005 μm to 0.3 μm, at least one organic corrosion inhibitor, optionally a silane, and other optional compounds. One of the proposed compounds to add in fine particle form is cerium dioxide, whereas conducting polymers are mentioned as possible organic corrosion inhibitor. The examples are focused on the treatment of galvanized steel sheets, obtaining films with thickness in the range of 0.8-1 μm, and showing no corrosion up to 720 hours salt spray test under ASTM B-117. Therefore, the composition described in this patent may contain a conducting polymer as corrosion inhibitor, cerium compounds and optionally a silane. However, different to the inorganic salts used in our invention, the cerium is added as cerium dioxide in the form of fine particles. Moreover, the formulation described in U.S. Pat. No. 6,875,479 contains also a film forming organic polymer, and a thermal treatment is required according to its curing conditions. Adhesion and corrosion results are only depicted for galvanized steel sheets.

SUMMARY

In one aspect, the disclosed conversion coating composition includes a conducting polymer dispersion, at least one silane and inorganic metallic salts, wherein a pH of the composition is between 1.0 and 6.0, and wherein the inorganic metallic salts include at least one zirconium salt and at least one cerium nitrate salt.

In another aspect, the disclosed process for treatment of a metallic surface may include the steps of: (a) pretreating the metallic surface; (b) coating the metallic surface with a conversion coating by contacting such metallic surface with a composition including a conducting polymer dispersion, at least one silane and inorganic metallic salts, wherein a pH of the composition is between 1.0 and 6.0, and wherein the inorganic metallic salts include at least one zirconium salt and at least one cerium nitrate salt; and (c) drying the coated metallic surface.

Other aspects of the disclosed composition and process will become apparent from the following detailed description, the accompanying drawings and the appended claims.

DETAILED DESCRIPTION

It has now been discovered that the corrosion performance of a conversion coating may be improved by incorporating at least one cerium nitrate salt to a conversion coating comprising a conducting polymer dispersion, at least one zirconium salt and at least one silane compound. In this patent application, the term "cerium nitrate salt" should be understood as a salt comprising cerium and nitrate ions and, optionally, other cations such as ammonium.

The present disclosure provides an environmentally friendly chemical conversion coating, which may be developed in a process that include a single coating step, that perform a dual function of improving corrosion resistance and promoting adhesion of the subsequent organic coating(s). Additionally, these coatings can be used in parts where low contact electrical resistance is also a requirement. The maximum electrical resistance values allowed by the MIL-DTL-81706-B standard are 775 μΩ/square cm before the salt spray test (MIL-DTL-81706B paragraphs 3.5.1 and 4.5.1, referring to ASTM B-117), and 1550 μΩ/square cm after 168 h of salt spray test under an applied electrode pressure of 1.38 MPa. Individual readings not greater than 20% in excess of the specified maximums shall be acceptable, provided that the average of all readings does not exceed the specified maximum resistance.

Thus, the present disclosure provides a chromium-free coating composition that may be used in the treatment of a metallic surface. Specifically, the chromium-free coating composition may be used to coat a metallic surface with a conversion coating. Despite of being chromium-free, the chromium-free coating is capable of providing equivalent to or superior corrosion protection, adhesion promotion for organic coatings and low contact electrical resistance than a chromium-type coating.

In a first aspect, there is disclosed a composition comprising a conducting polymer dispersion, at least one silane and inorganic metallic salts, wherein the pH of the composition is between 1.0 and 6.0; characterized in that the inorganic metallic salts are: at least one zirconium salt and at least one cerium nitrate salt.

Although both zirconium and cerium salts are used to improve the resistance to corrosion of the metallic surface, the suitable combination of these compounds in the composition of the present invention is not obvious for the skilled person. The combination of different salts may cause changes in the coating composition or in the conversion coating once applied on the metallic surface. In particular, the salts may interact between each other forming complexes, inhibiting the protective action of each of these salts or giving rise to precipitates in the composition and, therefore, obtaining a coating with non-desired properties such as lack of homogeneity or continuity, porosity, lower adherence, etc. These drawbacks in the development of improved conversion coatings, as well as the process of treatment comprising the coating of a metallic surface with such conversion coating, are illustrated in the comparative examples included in this patent application (see below), wherein it is shown that the combination of a zirconium salt with cerium chloride or cerium sulfate does not produce conversion coatings with the desired resistance to the corrosion.

In one embodiment, the present invention refers to the composition as described in this patent application, wherein the at least one zirconium salt is $K_2ZrF_6$ (potassium hexafluorozirconate).

In another embodiment, the composition contains at least one zirconium salt in a concentration of between 2.0 and 20 g/L. In one expression, the at least one zirconium salt is contained in a concentration of between 5.0 and 10.0 g/L, concentrations expressed in weight of Zr salts with respect to the total volume of the composition. In another expression, the at least one zirconium salt is $K_2ZrF_6$ (potassium hexafluorozirconate).

In another embodiment of the present invention, the at least one cerium nitrate salt is selected from the group consisting of cerium (IV) ammonium nitrate, cerium (III) nitrate and any combination thereof. In one expression, the cerium nitrate salt is cerium (IV) ammonium nitrate.

In another embodiment, the composition described in this patent application contains at least one cerium nitrate salt in a concentration of between 0.5 and 20 g/L. In expression the at least one cerium nitrate salt is contained in a concentration of between 0.5 and 3.0 g/L, concentrations expressed in weight of Ce salts with respect to the total volume of the composition. In another expression, the at least one cerium nitrate salt is selected from the group consisting of cerium (IV) ammonium nitrate, cerium (III) nitrate and any combination thereof. In yet another expression, the at least one cerium nitrate salt is cerium (IV) ammonium nitrate.

In another embodiment of the present invention, both the at least one zirconium salt and the at least one cerium salt contained in the composition, are as described in the above paragraphs.

In yet another embodiment, the composition described in this patent application comprises $K_2ZrF_6$ in a concentration of between 5.0 g/L and 10.0 g/L, and cerium (IV) ammonium nitrate in a concentration of between 0.5 and 3 g/L, concentrations expressed in weight of Zr or Ce salts, respectively, with respect to the total volume of the composition.

In another embodiment, this invention refers to the composition as described in this patent application, wherein the pH value of the composition is between 3.0 and 5.0, such as between 3.0 and 3.5 (e.g., 3.5).

The pH value of the composition described in the patent application may be adjusted to the desired range, using alkaline compounds such as ammonia, DMEA (dimethylethanolamine) or phosphate, or acidic compounds, including hexafluorozirconic acid and fluorhydric acid. For example, the pH value may be adjusted using $H_2ZrF_6$ (fluorozirconic acid) and/or DMEA (dimethylethanolamine). The use of DMEA as a base results in an improved conversion coating, with better results in preventing the corrosion of metallic surface and promoting the adhesion of organic coatings.

In another embodiment of the present invention, the at least one silane comprised in the composition described in this patent application, is present in an amount of from 0.01 v % to 1.0 v % (v/v) of the composition, such as from 0.1 v % to 0.5 v % of the composition. With this range of silane content, the adhesion of any organic coating subsequently applied on the conversion coated metallic surfaces improves without compromising the corrosion resistance.

A medium may be used for silane solution preparation. Silanes may be classified as water-based or solvent-based silanes. It may be desirable to use water-based silane systems with zero or very little alcohol content, due to VOC (volatile organic compound) restrictions. As an example, the at least one silane is water soluble.

In another embodiment, the at least one silane is of the formula:

$$YSiX_{(3-a)}Z_a$$

wherein X are equal or different hydrolysable groups, Y is non-hydrolysable group comprising a functional group, Z are independently selected from H and alkyl, and a is 0, 1 or 2.

By "hydrolysable group," it is meant that the group is susceptible to nucleophilic attack to cleave the group from the silicon atom. Each X is a hydrolysable group such as alkoxy (for example, methoxy ($-OCH_3$) or ethoxy ($-OC_2H_5$)). A hydrolysable group allows good adhesion of the compound to nucleophilic sites on the metal and/or further coatings.

By "non-hydrolysable," it is meant that the group is not susceptible to nucleophilic attack to cleave the group from the silicon atom.

The Y moiety may be joined to the silicon atom by a silicon-carbon bond.

The Y moiety comprises a functional group. That is, the Y moiety comprises a group capable of reacting to link a silicon atom to a further coating, a further silane or to a metal substrate. This functional group can be linked to the silicon atom directly or by an alkylene. Thus, the Y moiety may be, for example, vinyl ($-CH=CH_2$), vinylalkylene (-alkylene-$CH=CH_2$), amino ($-NH_2$), aminoalkylene (-alkylene-$NH_2$), epoxy, epoxyalkylene (-alkylene-epoxy), mercapto ($-SH$) or mercaptoalkylene (-alkylene-SH).

The term "alkylene" refers to a divalent saturated aliphatic hydrocarbon from 1 to 12 carbon atoms. Specifically, the alkylene can be an acyclic $C_1$-$C_6$-alkylene. More specifically, the alkylene can be an acyclic $C_1$-$C_3$ alkylene such as methylene, ethylene or propylene.

In the formula $YSiX_{(3-a)}Z_a$, Z are independently selected from H (hydrogen) and alkyl. That is, Z is a non-hydrolysable group that does not include a functional group for linking the silane to a further coating, a further silane or to the metal substrate.

By "alkyl," it is meant a straight or branched chain saturated acyclic hydrocarbon group of from 1 to 12 carbons, or a cyclic (e.g., cycloalkyl) saturated hydrocarbon group of from 3 to 12 carbon atoms, unless otherwise specified. Exemplary alkyl groups include $C_1$-$C_8$, $C_1$-$C_6$, $C_1$-$C_4$, $C_2$-$C_7$, $C_3$-$C_{12}$, and $C_3$-$C_6$ acyclic alkyl. Specific examples include methyl, ethyl, 1-propyl, 2-propyl, 2-methyl-1-propyl, 1-butyl, 2-butyl, and the like.

Unless otherwise noted, the alkyl group may include one or more heteroatoms in the hydrocarbon chain such as oxygen, nitrogen, sulfur or halogen. Specifically, the alkyl group may comprise, for example, one or more of the following groups: ether, amino, sulfyl or halogen.

In one example, in the above formula $YSiX_{(3-a)}Z_a$, a is 0 (zero). Thus, the at least one silane comprised in the composition is of formula $YSiX_3$, wherein Y and X are as defined above.

According to their chemical structures, silane molecules are divided into two major categories, mono-silanes and bis-silanes. Bis-type silanes have two silicon atoms in their molecule, whereas mono-silanes have only one, with a general formula of $X_3Si-R-SiX_3$. The silane may be symmetrical in this way for ease of synthesis and to minimize production costs. The main difference between mono- and bis-silanes is that the number of hydrolysable groups may be double in a bis-silane molecule than in a mono-silane molecule. Thus, it is reported that bis-silanes offer stronger interfacial adhesion (with the substrate) and denser films leading to better corrosion performance compared to mono-silanes, especially in unpainted state.

In another embodiment, the silane may be of formula $Z_a X_{(3-a)}Si-R-SiX_{(3-a)}Z_a$, where X, Z and a are as defined above, and R is a divalent linker such as an alkylene, an ether (e.g., -alkylene-O-alkylene-) or an aminodialkylene (e.g., -alkylene-NH-alkylene-). For example, R may be an ether such as $-CH_2OCH_2-$, or an aminodialkyene such as $-(CH_2)_3-NH-(CH_2)_3-$.

In another embodiment, the at least one silane may be selected from (3-Glycidoxypropyl)trimethoxysilane (GPMS), 1,2-Bis(trimethoxysilyl)ethane (TMSE), 1,2-Bis(Triethoxysilyl)ethane (BTSE), Bis[3-(trimethoxysilyl)propyl]amine (BAS) and Vinyltriacetoxysilane (VTAS), or combinations of two or more thereof. For example, the silane is (3-Glycidoxypropyl)trimethoxysilane (GPMS).

In another embodiment, the conducting polymer dispersion described herein comprises one conducting polymer selected from the group consisting of: polyaniline (PANI), polyethylenedioxythiophene (PEDOT) and polypyrrole (PPY). As one example, the conducting polymer dispersion is water-based dispersion. As another example, the conducting polymer dispersion is a polypyrrole (PPY) dispersion in water. As yet another example, the conducting polymer dispersion is a polypyrrole (PPY) dispersion in water with a solid content of 6% w/v.

In addition, other polymeric components such as acrylics, polyurethanes, epoxides, amino resins, phenolics, vinylics, polyesters, etc. may be added to enhance particular characteristics of the coating.

The composition of the present invention may be prepared as follows: after stirring the conducting polymeric dispersion and any optional additional polymeric component that the final composition might contain, a quantity of at least one zirconium salt and at least one cerium nitrate salt are added to the conducting polymeric dispersion. Subsequently, the dispersion is mixed until the added salts are suitably dissolved. Final concentrations of the added salts in the composition may vary from between 2.0 and 20 g/L of zirconium salt, and between 0.5 and 20 g/L of cerium nitrate salts, concentrations expressed in weight of Zr or Ce nitrate salts, respectively, with respect to the total volume of the composition.

After the inorganic salt(s) are dissolved, at least one silane is added to the conducting polymeric/salt(s) dispersion and, subsequently mixed until the added silane(s) are suitably dissolved. For example, the silane is (3-Glycidoxypropyl)trimethoxysilane (GPMS). The final total concentration of the added silanes in the composition may vary from 0.01 vol. (% v/v) to 1.0 (% v/v) of the composition.

Finally, the pH of the composition is adjusted using alkaline compounds such as ammonia, DMEA (dimethylethanolamine) or phosphate, or acidic compounds such as hexafluorozirconic acid and fluorhydric acid. For example, the pH value is adjusted using $H_2ZrF_6$ (fluorozirconic acid) and/or DMEA (dimethylethanolamine).

Additionally, other components such as other pH adjusting compounds, solvents, non-aqueous dispersion media, other silanes, dispersing agents, surfactants and coalescing solvents may be added to the composition of the invention to provide various degrees of coating effectiveness.

According to a second aspect, the present invention refers to a process for treatment of a metallic surface. The process comprises the steps of: (a) pretreating the metallic surface; (b) coating the metallic surface with a conversion coating by contacting such metallic surface with a composition comprising a conducting polymer dispersion, at least one silane and inorganic metallic salts, wherein the pH value of the composition is between 1.0 and 6.0; and (c) drying the coated metallic surface; characterized in that the inorganic metallic salts are: at least one zirconium salt and at least one cerium nitrate salt.

In other embodiments of the present invention, the composition used in the process for treatment of a metallic surface is as described in any of the embodiments of the first aspect of this patent application.

The metallic surface to be treated may be, for example, aluminum, copper, iron, magnesium, nickel and alloys comprising at least one of them. More specifically, the metallic surface may be an aluminum alloy, for example, the aluminum alloy is one of the alloys 7075-T6, 2024-T3 or 6061-T6.

According to the ASM International Handbook, the nominal composition of these alloys is the following:

TABLE 1

| AA | Si | Fe | Cu | Mn | Mg | Cr | Zn | Ti |
|---|---|---|---|---|---|---|---|---|
| 7075 | 0.40 | 0.50 | 1.2-2.0 | 0.30 | 2.1-2.9 | 0.18-0.28 | 5.1-6.1 | 0.20 |
| 2024 | 0.50 | 0.50 | 3.8-4.9 | 0.30-0.90 | 1.2-1.8 | 0.10 | 0.25 | 0.15 |
| 6061 | 0.40-0.80 | 0.70 | 0.15-0.40 | 0.15 | 0.80-1.2 | 0.04-0.35 | 0.25 | 0.15 |

Therefore, while the discussion herein is concerned primarily with aluminum and certain specific alloys of aluminum, the disclosure is not so limited. In particular, different metal compositions and alloys as well as additional applications, e.g., automotive, industrial, etc. would benefit from the disclosed process or method and resulting coating as well.

In one particular embodiment, the present invention refers to the process for treatment of an aluminum alloy, such as the alloy 7075-T6, comprising the steps of: (a) pretreating the aluminum alloy surface; (b) coating the aluminum alloy surface with a conversion coating by contacting such metallic surface with a composition comprising: a polypyrrole dispersion in water, (3-Glycidoxypropyl)trimethoxysilane (GPMS), such as between 0.1% and 0.5%(v/v) of the composition, potassium hexafluorozirconate in a concentration of between 5.0 and 10 g/L, expressed in weight of Zr salts with respect to the total volume of the composition, and cerium (IV) ammonium nitrate in a concentration of between 0.5 and 3.0 g/L, expressed in weight of Ce nitrate salts with respect to the total volume of the composition, wherein the pH value of the composition is between 3.0 and 5.0, such as between 3.0 and 3.5; and (c) drying the metallic surfaces.

As can be appreciated by those skilled in the art, chemical conversion surface treatments/coatings generally involve the process of immersion or other contact methods such as spray or brush of a metal (e.g., aluminum and/or alloys of aluminum) with a composition that, through a redox reaction at the metallic surface or chemical deposition at the metallic surface due to physicochemical changes in the composition, form a superficial adhered protective conversion coating. Such conversion coating typically exhibits quite low solubility and, in the case of aluminum, a thickness of approximately 20 nm (nanometer) to 1 mm (millimeter), depending upon the process parameters and the alloy treated. The color of the resulting conversion coating depends upon the metallic surface and the bath/spray parameters.

In another embodiment, the present invention refers to the process of treatment of a metallic surface described in this patent application, wherein the coating is carried out in a single-step by immersion of the metallic pretreated surface, such as an aluminum alloy, into the composition of the invention, for a period of time of at least 1 (one) minute, such as between 1 and 10 minutes, or between 2 and 5 minutes.

In another embodiment, the coating is performed in a single step, by immersion of the pretreated metallic surface, such as an aluminum alloy, into the composition of the invention, at a temperature between 15 and 30° C., such as for the period of time described in the above paragraph.

Thus, the process of treatment according to these embodiments, different from other processes that use cerium compounds described in the art, allows the metallic surface to be coated with a conversion coating with a resistance to corrosion and adhesion similar to known chromium conversion coatings by immersion of the metallic surface into the composition of the invention, for a period of time between 1 and 10 min at a temperature between 15 and 30° C.

Advantageously, the conversion coating of the invention may be applied to the metallic surface in a process that comprises a single coating step by immersion, without any heat treatment and in a very short period of time. Accordingly, metal surface, e.g., panels, to be coated are immersed into the composition described in this patent application, the composition comprising a conducting polymer, zirconium salts, cerium nitrate salts and silanes; optionally along with other additives that affect the composition and/or the resulting conversion coating, e.g., dispersion agents, wetting agents, or polymeric film formation agents.

In another embodiment, the present invention refers to the process of treatment of a metallic surface described in this patent application, wherein the drying step is carried out at a temperature of between 15 and 30° C., such as during a period of time of 8 and 30 hours.

Thus, this invention provides a process for treatment of a metallic surface that allows the metallic surface, such as an aluminum alloy, to be coated with a conversion coating with improved resistance to corrosion and adhesion to subsequent organic coatings, without the need of high temperature or time consuming coating treatments.

The pretreatment step serves to prepare the surface of the metal for the coating. Accordingly, the pretreatment step at least involves the cleaning of the surface. The pretreatment step may further include the steps of: degreasing the surface, cleaning the surface and deoxidizing the surface.

The process for the treatment of a metallic surface described in this patent application may further comprise the steps of: rinsing the metallic surface after cleaning, rinsing the surface after deoxidizing and not-rinsing the surface after coating.

Figure 1:
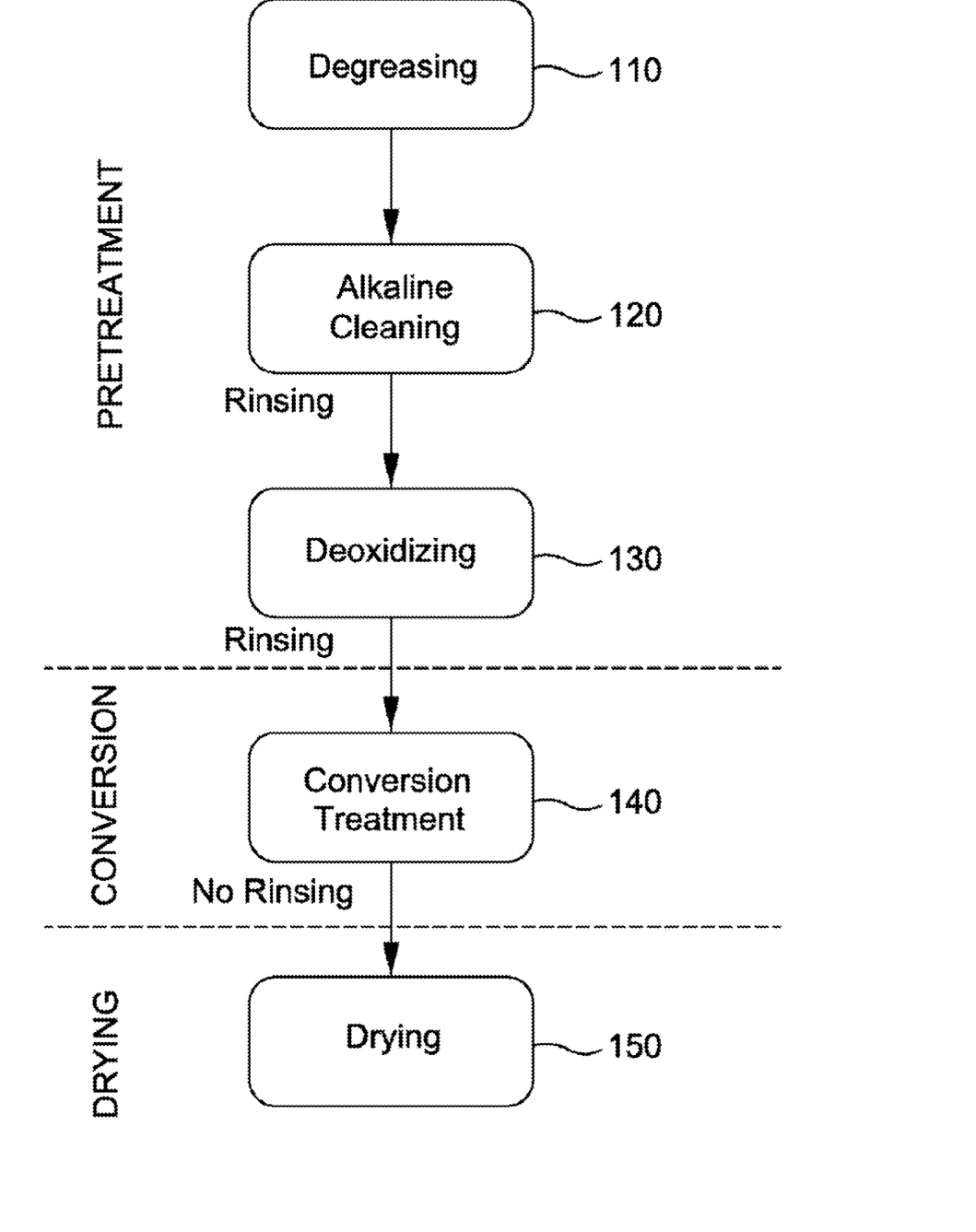
FIG. 1 is a process flow chart depicting the steps associated with an embodiment of the disclosed process for treatment a metallic surface with a chromium-free conversion coating of the disclosure.

FIG. 1 depicts an overview of the steps involved in the process for the treatment of a metallic surface of the present invention, according to a particular embodiment. More particularly, the process includes three general steps namely: a) pretreatment, b) coating, and c) drying as described above in this patent application. According to this particular embodiment, the pretreatment begins with degreasing the metal panel to be coated (110). Degreasing may be performed using any of a variety of known detergent solutions and/or organic solvents. Additionally, such degreasing, like all of the process steps, may be performed by spray, immersion or a mixture of the two techniques.

Once the panel to be coated is degreased, it is then cleaned (120) with an alkali solution. Suitable alkali solutions are commercially available under various trade names e.g., TURCO (4215NCLT), and this alkali cleaning is advantageously performed for approximately 10 (ten) minutes at a modest elevated temperature, e.g., 50° C. (degrees Celsius). After cleaning, the panel is rinsed with water and then deoxidized (130) with, for example, TURCO Smut Go NC for approximately 5 (five) minutes at a temperature between 20 and 35° C. and then rinsed. Advantageously, other pickling or desmutting steps can be used depending on the treated substrate material and surface material or thickness to be removed.

As can be now appreciated, the process may employ commercially available pretreatment steps that are well known and understood. Advantageously, such pretreatment is compatible with a variety of alloys and their application is widely understood.

In one particular embodiment, the process for the treatment of a metallic surface described in this patent application includes the immersion of an aluminum alloy panel (140) in the composition for a period of time, such as 2 minutes, followed by direct drying of the treated panel (150), without rinsing the coated metallic surface.

Generally, the composition is prepared by an initial stirring of the conducting polymer dispersion. Advantageously, the polymer dispersion(s) used may be commercially available water-based ones and exhibit satisfactory formulation(s) including solid content, pH, and dispersive additives. Consequently, only a minimal amount of stirring is required for these commercial dispersions.

While the process and the resulting coating(s) have been described in the context of immersion into the composition of the invention, it is understood that alternative coating techniques, e.g. spray coating, may be used as well. Lastly, other metallic substrates, such as steel, aluminum, copper, iron, magnesium, nickel or any of their alloys, will benefit from our method and coating(s).

In a third aspect, the present invention also refers to the conversion coating applied onto a metallic surface by the process described in this patent application.

In a fourth aspect, the present invention refers to the use of the conversion coating described in this patent application to prevent the corrosion of metallic surfaces, to promote the adhesion of organic coatings or both.

In one embodiment, this invention refers to the use of the conversion coating described to prevent corrosion of a metallic surface selected from the group consisting of aluminum, copper, iron, magnesium, nickel and alloys thereof. As one general, non-limiting example, the metallic surface is an aluminum alloy. As one specific non-limiting example, the aluminum alloy is 7075-T6.

In a fifth aspect, the present invention also refers to the metallic surface treated using the process described in this patent application. As one general, non-limiting example, the metallic surface is an aluminum alloy. As one specific, non-limiting example, the aluminum alloy is 7075-T6.

Thus, the present invention provides a coated metallic surface with a high resistance to corrosion, high adhesion to organic coatings and low contact electrical resistance. Due to these properties, the metallic surface of this invention is very useful in several applications, in particular in aircraft, automotive, marine, construction, industrial or household applications.

While the disclosure discusses and describes herein some specific examples, those skilled in the art will recognize that our teachings are not so limited. More specifically, it is understood that the process of treatment and conversion coating may be used in virtually any application requiring corrosion protection, and/or adhesion of subsequently applied organic coating(s) and/or low electrical surface contact resistance and in particular, those applications concerned with the problems associated with hexavalent chromium. Accordingly, it is understood that the process of treatment and conversion coating described in this patent application may be applicable to any automotive, marine, construction, industrial, or household use in addition to aeronautical applications.

These and other features and advantages of the disclosure will become apparent with reference to the attached drawing and detailed description.

In this patent application, different aspects, embodiments and features are defined in detail. Each aspect, embodiment or feature so defined may be combined with any other aspect(s), embodiment(s) or feature(s) (preferred, advantageous or otherwise) unless clearly indicated to the contrary.

EXAMPLES

Example 1

A number of samples of 7075T6 aluminum alloy were subjected to the process for treatment of metallic surface of the present invention and, then, the corrosion resistance and adhesion was evaluated. The particular experimental conditions are shown in the Table 1 for PPY/Zr/silane/Ce, based compositions and the Table 2 shows the obtained results.

The sample panels were degreased using organic solvents and then, alkaline cleaned with the commercially available TURCO 4215NCLT solution for approximately 15 minutes at a temperature between 45 and 55° C. After alkaline cleaning, the samples were rinsed with water. Afterwards, the panels were deoxidized with the commercially available TURCO Smut Go NC solution for approximately 5 minutes at a temperature between 20 and 30° C., and then rinsed with water.

Then, the samples were coated by immersion in the compositions for approximately 2 minutes and directly dried. For all of the samples shown in Table 1, the drying conditions ranged between 20 and 30° C. and a period of time of at least 18 hours. The best treatment in terms of corrosion performance in salt spray test (MIL-DTL-81706B paragraphs 3.5.1 and 4.5.1, referring to ASTM B-117), also provided adhesion performance of a subsequently applied organic coating complying with the aeronautical requirements (MIL-DTL-81706B paragraphs 3.5.2 and 4.5.2) in the scribed wet tape paint adhesion tests.

The PPY dispersion used in these examples, Eeonomer 7000 from Eeonyx, is characterized for the following features:

| | |
|---|---|
| Solid content | 6.0% |
| Dilution with | Water |
| pH | 3 or less |
| Conductivity (S/cm) | 0.01-0.001 Cast film |
| Surface Resistivity (Ohm) | 10E4-10E6 |

Table 2 shows the experimental conditions for a PPY/Zr/silane/Ce set of samples. In this particular set, the [Zr] (zirconium) concentration was effected by varying the amounts of $K_2ZrF_6$ (potassium hexafluorozirconate) and the pH was adjusted with $H_2ZrF_6$ (fluorozirconic acid) and/or DMEA (dimethylethanolamine).

TABLE 2

PPY/Zr/Silane/Ce

| Experiment | [PPY] (%) | Zr (g/l)* | GPMS (% vol) | Cerium nitrate salt (g/l) | pH |
|---|---|---|---|---|---|
| PPY 48 | 0.25 | 8 | 0.10 | 0 | 3.5 |
| PPY 49 | 0.25 | 8 | 0.10 | 1 Cerium ammonium nitrate | 3.5 |
| PPY 50 | 0.25 | 8 | 0.10 | 0.5 Cerium ammonium nitrate | 3.5 |
| PPY 51 | 0.25 | 8 | 0.10 | 2 Cerium ammonium nitrate | 3.5 |
| PPY 52 | 0.25 | 8 | 0.10 | 1 Cerium ammonium nitrate | 3.0 |
| PPY 53 | 0.25 | 8 | 0.10 | 1 Cerium ammonium nitrate | 5.0 |
| PPY 54 | 0.25 | 5 | 0.10 | 0.5 Cerium ammonium nitrate | 3.0 |
| PPY 55 | 0.25 | 5 | 0.10 | 1 Cerium ammonium nitrate | 3.0 |
| PPY 56 | 0.25 | 5 | 0.10 | 2 Cerium ammonium nitrate | 3.0 |
| PPY 57 | 0.25 | 5 | 0.10 | 3 Cerium ammonium nitrate | 3.0 |
| PPY 58 | 0.10 | 8 | 0.10 | 1 Cerium ammonium nitrate | 3.5 |
| PPY 59 | 0.50 | 8 | 0.10 | 1 Cerium ammonium nitrate | 3.5 |
| PPY 60 | 0.25 | 5 | 0.10 | 0.5 Cerium nitrate | 3.0 |
| PPY 61 | 0.25 | 5 | 0.10 | 1 Cerium nitrate | 3.0 |
| PPY 62 | 0.25 | 5 | 0.10 | 1.5 Cerium nitrate | 3.0 |
| PPY 63 | 0.25 | 5 | 0.10 | 3 Cerium nitrate | 3.0 |
| PPY 64 | 0.25 | 8 | 0.10 | 1 Cerium nitrate | 3.0 |
| PPY 65 | 0.25 | 8 | 0.10 | 1 Cerium nitrate | 3.5 |
| PPY 66 | 0.25 | 5 | 0.10 | 1 Ce ammonium nitrate + 1 Cerium nitrate | 3.0 |
| PPY 67 | 0.25 | 5 | 0.10 | 2 Ce ammonium nitrate + 1 Cerium nitrate | 3.0 |
| PPY 68 | 0.25 | 8 | 0.10 | 1 Ce ammonium nitrate + 0.03 Cerium chloride | 3.5 |
| PPY 69 | 0.25 | 8 | 0.10 | 1 Ce ammonium nitrate + 0.5 Cerium chloride | 3.5 |

*[Zr] g/L = [$K_2ZrF_6$] g/L

Table 3 shows the corrosion resistance for the PPY/Zr/silane/Ce conversion coating on 7075-T6 aluminum alloy. The results obtained were after 168 hours of salt spray corrosion testing ((MIL-DTL-81706B paragraphs 3.5.1 and 4.5.1, referring to ASTM B-117). The corrosion score values go from 0 (zero) for the worst corrosion performance to 10 (ten) for best corrosion performance. The hexavalent chromium based commercial ALODINE 1200S exhibited the best corrosion performance, with a corrosion score of 10.0.

Table 3 also shows the adhesion performance of a subsequently applied organic coating on 7075-T6 aluminum alloy. The paint adhesion performance was measured according to a wet tape paint adhesion test. Once dried (after 14 days air curing), the corresponding conversion coated panels were painted with an epoxy primer according to the MIL-PRF-85582 standard. The epoxy primer used was a water-reducible epoxy primer system made of 10PW20-4 base and ECW-104 hardener according to MIL-PRF-85582 Type 1 Class 2, provided by Akzo Nobel Aerospace Coatings, BV. Two parallel, 2 inch long scratches, ¾ to 1 inch apart through the coating and to the substrate were made on the panels. The parallel scratches were joined with two intersecting lines, or an "X" pattern. The primed and scribed panels were immersed in deionized water during 24 hours, prior to carrying out the wet paint adhesion tests. Within 2 minutes after removing test panels from water adhesive tape was applied and pressed against the test surface with firm hand pressure and then removed. The hexavalent chromium based commercial ALODINE 1200S exhibited the best pant adhesion performance, with an adhesion score of 10.0. The adhesion test score values go from 0 (zero) for the worst adhesion performance (total detachment of the primer) to 10 (ten) for best adhesion performance (no detachment of the primer).

TABLE 3

| EXPERIMENT | CORROSION SCORE 7075 T6 | ADHESION SCORE 7075 T6 |
|---|---|---|
| PPY 48 | 8.8 | 9.8 |
| PPY 49 | 9.7 | 9.8 |
| PPY 50 | 9.5 | — |
| PPY 51 | 9.5 | — |
| PPY 52 | 9.4 | — |
| PPY 53 | 9.0 | — |
| PPY 54 | 9.4 | — |
| PPY 55 | 9.4 | — |
| PPY 56 | 9.0 | — |
| PPY 57 | 9.0 | — |
| PPY 58 | 9.4 | — |
| PPY 59 | 9.4 | — |
| PPY 60 | 9.4 | — |

TABLE 3-continued

| EXPERIMENT | CORROSION SCORE 7075 T6 | ADHESION SCORE 7075 T6 |
|---|---|---|
| PPY 61 | 9.4 | — |
| PPY 62 | 9.5 | — |
| PPY 63 | 9.4 | — |
| PPY 64 | 9.0 | — |
| PPY 65 | 9.5 | — |
| PPY 66 | 9.0 | — |
| PPY 67 | 8.8 | — |
| PPY 68 | 9.0 | — |
| PPY 69 | 9.0 | — |
| Alodine 1200S | 10.0 | 10.0 |

COMPARATIVE EXAMPLE

The experimental conditions described in Example 1 (see above) have been reproduced using a conducting polymer dispersion containing cerium salts different to cerium nitrate salts, in particular cerium sulfate or cerium chloride. The specific conditions of each comparative experiment are detailed in Table 4 below.

TABLE 4

PPY/Zr/Silane/Ce

| Experiment | [PPY] (%) | Zr (g/l)* | GPMS (% vol) | Cerium salt (g/l) | pH |
|---|---|---|---|---|---|
| PPY 70 | 0.25 | 5 | 0.10 | 1 Cerium sulfate | 3.0 |
| PPY 71 | 0.25 | 5 | 0.10 | 2 Cerium sulfate | 3.0 |
| PPY 72 | 0.25 | 5 | 0.10 | 5 Cerium sulfate | 3.0 |
| PPY 73 | 0.25 | 5 | 0.10 | 5 Cerium sulfate | 3.5 |
| PPY 74 | 0.25 | 5 | 0.10 | 5 Cerium sulfate | 5.0 |
| PPY 75 | 0.25 | 5 | 0.10 | 0.5 Cerium chloride | 3.5 |
| PPY 76 | 0.25 | 5 | 0.10 | 1 Cerium chloride | 3.5 |
| PPY 77 | 0.25 | 5 | 0.10 | 2 Cerium chloride | 3.5 |
| PPY 78 | 0.25 | 5 | 0.10 | 5 Cerium chloride | 3.5 |
| PPY 79 | 0.25 | 8 | 0.10 | 0.5 Cerium chloride | 3.0 |
| PPY 80 | 0.25 | 8 | 0.10 | 0.5 Cerium chloride | 3.5 |
| PPY 81 | 0.25 | 8 | 0.10 | 0.5 Cerium chloride | 5.0 |

*[Zr] g/L = [K$_2$ZrF$_6$] g/L

Corrosion inhibition has been checked in the same conditions as Example 1. Results obtained are detailed in Table 5 below.

TABLE 5

| EXPERIMENT | CORROSION SCORE 7075 T6 |
|---|---|
| PPY 70 | 7.4 |
| PPY 71 | 7.2 |
| PPY 72 | 8.4 |
| PPY 73 | 9.0 |
| PPY 74 | 9.0 |
| PPY 75 | 7.4 |
| PPY 76 | 7.2 |
| PPY 77 | 8.4 |
| PPY 78 | 8.8 |
| PPY 79 | 9.0 |
| PPY 80 | 9.0 |
| PPY 81 | 8.0 |
| Alodine 1200S | 10.0 |

What is claimed is:

1. A composition comprising a conducting polymer dispersion, at least one silane and inorganic metallic salts, wherein a pH of the composition is between 1.0 and 6.0, and wherein the inorganic metallic salts comprise at least one zirconium salt and at least one cerium nitrate salt.

2. The composition of claim 1 wherein the at least one zirconium salt is potassium hexafluorozirconate.

3. The composition of claim 1 wherein the at least one cerium nitrate salt is selected from the group consisting of cerium (III) nitrate, cerium (IV) ammonium nitrate and any combination thereof.

4. The composition of claim 1 wherein the at least one cerium nitrate salt is cerium (IV) ammonium nitrate.

5. The composition of claim 1:
wherein the at least one zirconium salt is in a concentration of between 2.0 and 20 g/L, expressed in weight of Zr salts with respect to the total volume of the composition, and
wherein the at least one cerium nitrate salt is in a concentration of between 0.5 and 20 g/L, expressed in weight of Ce nitrate salts with respect to the total volume of the composition.

6. The composition of claim 1 wherein the pH is between 3.0 and 5.0.

7. The composition of claim 1 wherein the at least one silane is present in an amount of from about 0.01 v % (v/v) to about 1.0 v % (v/v) of the composition.

8. The composition of claim 1 wherein the at least one silane is of the formula:

$$YSiX_{(3-a)}Z_a$$

wherein
X are equal or different hydrolysable groups,
Y is non-hydrolysable group comprising a functional group,
Z are independently selected from H and alkyl, and
a is 0, 1 or 2.

9. The composition of claim 1 wherein the at least one silane comprises a member selected from the group consisting of (3-Glycidoxypropyl)trimethoxysilane (GPMS), 1,2-Bis(trimethoxysilyl)ethane (TMSE), 1,2-Bis(Triethoxysilyl)ethane (BTSE), Bis[3-(trimethoxysilyl)propyl]amine (BAS) and Vinyltriacetoxysilane (VTAS), and combinations thereof.

10. The composition of claim 1 wherein the conducting polymer dispersion comprises one conducting polymer selected from the group consisting of polyaniline, polyethylenedioxythiophene and polypyrrole.

11. A metallic surface contacted with the composition of claim 1.

12. A process for treatment of a metallic surface, the process comprising steps of:
a) pretreating the metallic surface;
b) coating the metallic surface with a conversion coating by contacting such metallic surface with a composition, the composition comprising a conducting polymer dispersion, at least one silane and inorganic metallic salts, wherein a pH of the composition is between 1.0 and 6.0, and wherein the inorganic metallic salts comprise at least one zirconium salt and at least one cerium nitrate salt; and
c) drying the coated metallic surface.

13. The process of claim 12 wherein the coating is performed in a single-step, by immersion of the pretreated metallic surface into the composition for a period of time between 1 and 10 minutes and at a temperature between 15 and 30° C.

14. The process of claim 12 wherein the at least one zirconium salt is potassium hexafluorozirconate.

15. The process of claim 12 wherein the at least one cerium nitrate salt is selected from the group consisting of cerium (III) nitrate, cerium (IV) ammonium nitrate and any combination thereof.

16. The process of claim 12 wherein the at least one cerium nitrate salt is cerium (IV) ammonium nitrate.

17. The process of claim 12:
   wherein the at least one zirconium salt is in a concentration of between 2.0 and 20 g/L, expressed in weight of Zr salts with respect to the total volume of the composition, and
   wherein the at least one cerium nitrate salt is in a concentration of between 0.5 and 20 g/L, expressed in weight of Ce nitrate salts with respect to the total volume of the composition.

18. The process of claim 12 wherein the pH is between 3.0 and 5.0.

19. The process of claim 12 wherein the at least one silane is present in an amount of from about 0.01 v % (v/v) to about 1.0 v % (v/v) of the composition.

20. The process of claim 12 wherein the at least one silane is of the formula:

$$YSiX_{(3-a)}Z_a$$

wherein
   X are equal or different hydrolysable groups,
   Y is non-hydrolysable group comprising a functional group,
   Z are independently selected from H and alkyl, and
   a is 0, 1 or 2.

* * * * *